Figure 1:
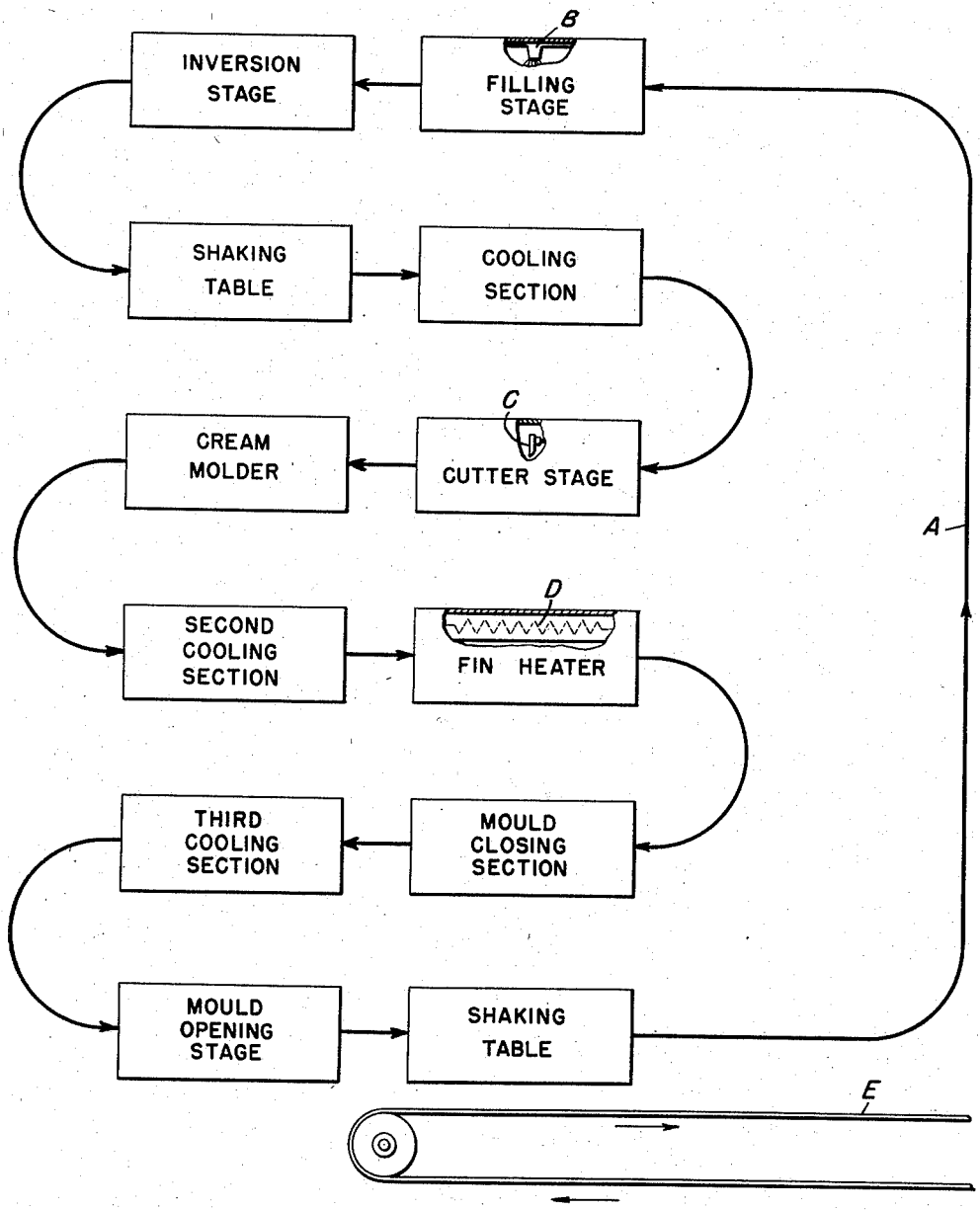

United States Patent Office 2,896,557
Patented July 28, 1959

2,896,557

METHOD OF MANUFACTURING HOLLOW OBJECTS OF CHOCOLATE IN A TWO-PIECE MOULD

Kai Christian Sophus Aasted, Copenhagen, and Carl Johansen, Lyngby, Denmark

Application May 4, 1954, Serial No. 427,598

Claims priority, application Denmark May 5, 1953

3 Claims. (Cl. 107—54)

This invention relates to a method of manufacturing hollow objects of chocolate such as Easter eggs in two-piece moulds.

Originally, such objects were moulded as shells and when these had been removed from their mould they were held with their edges against a hot plate and subsequently pressed against each other, the edges fusing to form the complete object.

Later on moulds were adopted for the manufacture of the aforesaid objects. The halves of such moulds were assembled by means of a pair of clamps after the necessary amount of chocolate had been deposited in the mould. The moulds were then put into a basket in which the moulds were mechanically rotated at a suitable temperature, whereby the chocolate was distributed as a uniform layer on the inside wall of the moulds to be finally removed as a moulded unit after cooling of the moulds.

The object of the invention is to provide a simple and effective method for the assembly of Easter eggs and similar hollow objects manufactured in two-piece moulds which are advanced mechanically one after another through the various sections of a chocolate moulding plant. The essential feature of the invention consists in leaving, when shaking off the excessive amount of liquid chocolate mass deposited in a mould half-shell, a chocolate fin projecting out from the half-shell. This fin, at the time the chocolate shell is to be assembled with a corresponding shell, is in its wholly or partly melted state and consequently may be used to provide the necessary attachment between the two half shells.

The method of the invention is particularly suitable for the manufacture of hollow objects of chocolate, e.g. Easter eggs or Christmas articles, that are of highly seasonal character, in chocolate machines using moulding frames which may be changed in accordance with the specific goods to be manufactured.

By the method according to the invention a very smooth and uniform assembly of the two chocolate half shells is provided, unlike known methods in which the assembly is provided by means of an external stripe-shaped coating. Such an external coating may often be scraped off because it has not fused with the underlying material, or with the shell-like inside coating which is squeezed out between the edges of the chocolate shells thereby leaving unattractive ribs on the outer side of the moulded object which must subsequently be removed by hand.

In a preferred embodiment of the method according to the invention the chocolate fin may be formed by causing the mould half-part filled with the moulded half shell, after partial cooling, if any, to pass a cutter close to the edge of the mould half-part.

In producing the fin the edges of the mould half-part may, according to the invention, be caused to pass the cutter at a distance of about 1 mm. At a suitable temperature of the chocolate, the cutter will then leave a cleanly cut fin of the specified 1 mm. height along the entire inside edge of each moulded half-shell.

An apparatus for carrying out the method in accordance with the invention is shown in the accompanying drawings, wherein Fig. 1 is a diagrammatic illustration of a combination of processing steps embodying features of the invention.

Figure 3:
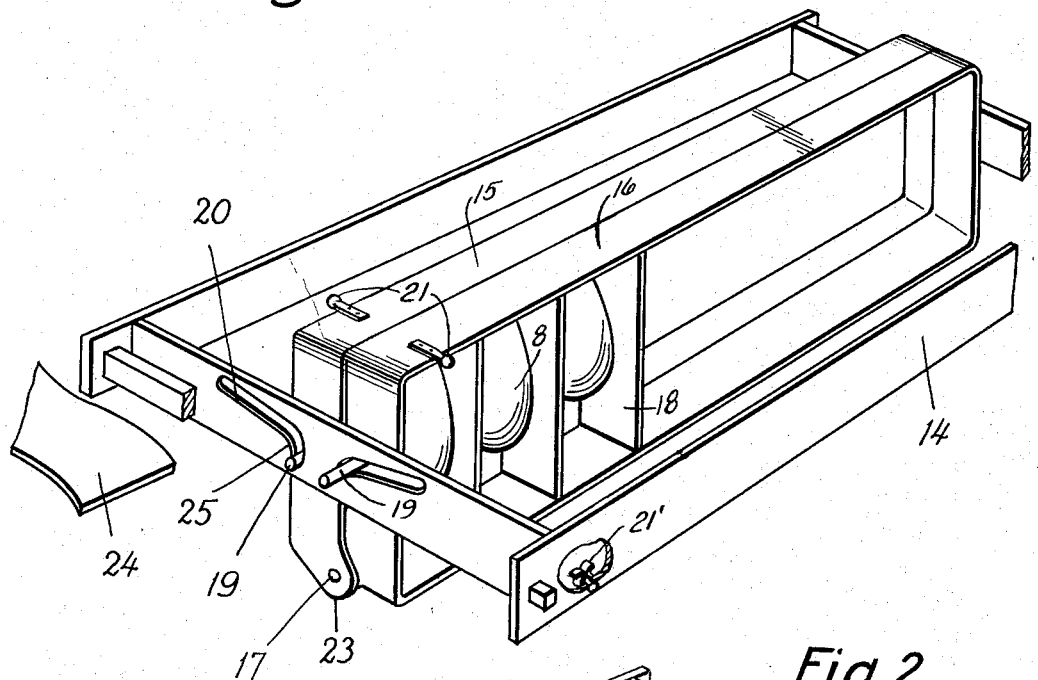
Figure 2:
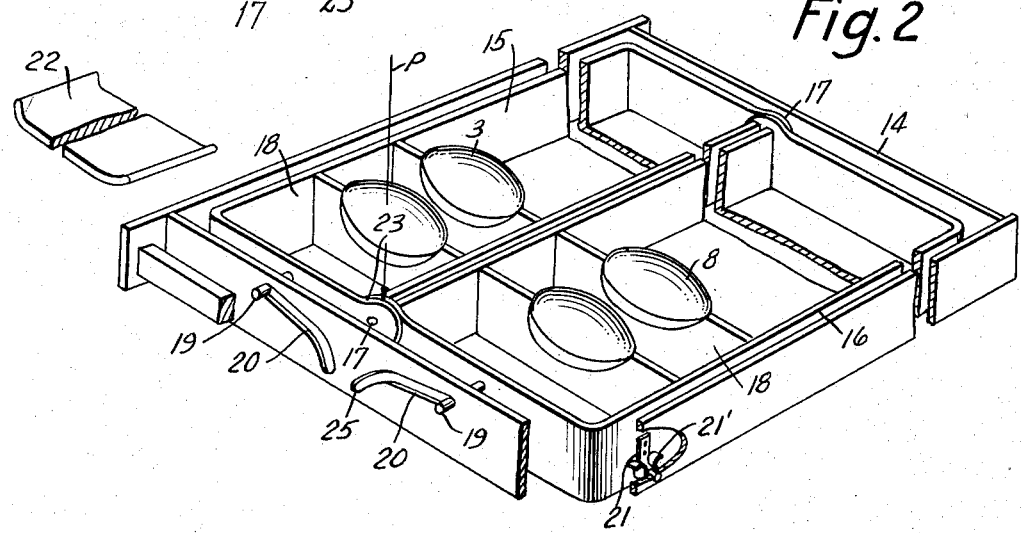

Fig. 2 is a perspective view of a mould having both sets of mould half-parts pivotally mounted, and Fig. 3 is a perspective view of the same in closed state.

Referring to the apparatus shown in the drawings, the moulds shown in Figs. 2 and 3 both have a set of mould half-parts 3 and 8 pivotally supported in a common exterior frame 14, and the corresponding mould supports 15 and 16 may turn in relation to each other about hinges 17.

Each support 15 and 16 consists of an open frame with transverse ribs 18, each carrying a moulding half-part, and the supports 15 and 16 have at their ends pivot journals 19 introduced into J-shaped grooves 20 in the frame 14. The mould is kept open by means of catches, as shown at 21 and 21' in Fig. 3.

When all of mould half-parts of a mould carrier in a universal moulding plant have passed spouts or nozzles by means of which they have been totally filled with chocolate, and subsequently, in an upside-down position, have passed a shaking table in which the chocolate is discharged from the moulds except for a thin, shell-like layer, the mould half-parts are conveyed through a cooling section in which they pass a cutter at a distance of about 1 mm. The cutter may be a knife which trims the jagged chocolate edges left by the shaking operation so as to leave an overall fin about 1 mm. high.

If it is desired to add a cream filling to the chocolate, the mould may be caused to pass a cream moulder with a subsequent cooling section, and when the time approaches for closing the mould, the fin is heated until partly melted. The melting may conveniently be effected by causing the mould to pass beneath an electric heating element.

The mould subsequently meets a fixed stop plate 22 which, during the passage of the mould under it, will exert a pressure against a raised section 23 of the mould support 15 opposite the hinge 17. Both of the mould supports 15 and 16 will thereby be removed from their catches 21 and the mould will close, the two mould supports 15 and 16 dropping into the position indicated in Fig. 3 with the pivot journals 19 sliding into an abruptly downwardly extending part 25 of the grooves 20.

Each mould half-part has sharp edges and when the mould half-parts subsequently close two by two, their edges will cut away excessive amounts of chocolate which will fall down on a support, to be removed for subsequent re-use.

When the mould has passed an additional cooling section of the plant, it is opened as the section 23 meets a fixed contact rail 24 (Fig. 3) which raises the mould supports 15 and 16, which owing to the shape of the grooves 20, are swung out in opposite directions and again retained in their open position by the catches 21. By this operation the moulded object will remain in one of the moulding half-parts, and when the mould is later carried in its upside down position across a conveyor band which is moved at the same speed as the mould and the latter is passed across a shaking table, the moulded object will fall down on to a conveying band on which it is carried out of the plant, and the moulding half-parts are returned for re-use. The foregoing sequence of operations is shown diagrammatically in Fig. 1 wherein there is shown the mold conveyor A passing to a filling stage provided with spout or nozzle B, an inversion stage, a shaking table, a cooling section, a cutter stage provided with a knife C, a cream moulder, a second cooling section, a fin heater having a heating element D, a mould closing section, an additional cooling section, a mould opening stage, and a mould discharging shaking table over a conveying band E.

We claim:

1. In the manufacture of hollow chocolate objects in two-piece moulds formed from two complementary mould halves, the steps which comprise, introducing molten chocolate into each mould half, inverting the mould halves to remove excess liquid chocolate contained in each mould half but to leave a chocolate shell in the mould half and simultaneously causing a chocolate fin to form along the peripheral edges of each chocolate shell, cooling the thus-formed shells, and assembling the chocolate shells to form a unitary object by melting the fin on each shell and pressing the melted fins of two chocolate shells together, whereby the two halves of the object are integrally united by the chocolate of the fins, and allowing the resulting object to cool.

2. In the manufacture of hollow chocolate objects in two-piece moulds formed from two complementary mould halves, the steps which comprise introducing molten chocolate into each mould half, inverting the mould halves to remove excess liquid chocolate contained in each mould half but to leave a chocolate shell in the mould half and simultaneously causing a chocolate fin to form along the peripheral edges of each chocolate shell, cooling the thus-formed shells, trimming said fins to a uniform height, and assembling the chocolate shells to form a unitary object by melting the fin on each shell and pressing the melted fins of two chocolate shells together, whereby the two halves of the object are integrally united by the chocolate of the fins, and allowing the resulting object to cool.

3. In the manufacture of hollow chocolate objects in two-piece moulds formed from two complementary mould halves, the steps which comprise introducing molten chocolate into each mould half, inverting the mould halves to remove excess liquid chocolate contained in each mould half but to leave a chocolate shell in the mould half and simultaneously causing a chocolate fin to form along the peripheral edges of each chocolate shell, cooling the thus-formed shells, trimming said fins to a uniform height of about 1 mm., and assembling the chocolate shells to form a unitary object by melting the fin on each shell and pressing the melted fins of two chocolate shells together, whereby the two halves of the object are integrally united by the chocolate of the fins, and allowing the resulting object to cool.

References Cited in the file of this patent

UNITED STATES PATENTS

| | | |
|---|---|---|
| 927,435 | Sigrist | July 6, 1909 |
| 1,417,446 | Brigham | May 23, 1922 |
| 1,777,896 | Rossi | Oct. 9, 1930 |
| 2,585,000 | Friddell | Feb. 12, 1952 |

FOREIGN PATENTS

| | | |
|---|---|---|
| 15,949 | Great Britain | Nov. 19, 1887 |
| 117,153 | Switzerland | Jan. 3, 1927 |